United States Patent
Chan et al.

(10) Patent No.: US 7,590,137 B1
(45) Date of Patent: Sep. 15, 2009

(54) PARAMETERIZABLE COMPACT NETWORK PROCESSOR FOR LOW-LEVEL COMMUNICATION WITH AN INTEGRATED CIRCUIT

(75) Inventors: Chi Bun Chan, Longmont, CO (US); Jonathan B. Ballagh, Boulder, CO (US); Nabeel Shirazi, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 611 days.

(21) Appl. No.: 11/285,708

(22) Filed: Nov. 22, 2005

(51) Int. Cl.
 *H04J 3/24* (2006.01)
(52) U.S. Cl. ............ 370/419; 370/474; 710/20; 703/13
(58) Field of Classification Search .......... 370/476, 370/392, 393, 474, 389; 709/236, 245
 See application file for complete search history.

(56) References Cited

U.S. PATENT DOCUMENTS

| | | | |
|---|---|---|---|
| 6,363,076 B1 * | 3/2002 | Allison et al. ............... 370/419 |
| 6,647,004 B2 * | 11/2003 | Allen et al. .................. 370/335 |
| 6,687,256 B2 * | 2/2004 | Modali et al. ............... 370/412 |
| 6,724,759 B1 * | 4/2004 | Chang et al. ................ 370/389 |
| 7,149,212 B2 * | 12/2006 | Calvignac et al. ........... 370/360 |
| 7,187,687 B1 * | 3/2007 | Davis et al. ................. 370/419 |
| 7,246,191 B2 * | 7/2007 | Stanton ...................... 710/310 |
| 7,283,522 B2 * | 10/2007 | Siddabathuni .............. 370/389 |
| 7,304,996 B1 * | 12/2007 | Swenson et al. ............ 370/394 |
| 2001/0050923 A1 * | 12/2001 | Park et al. ................... 370/474 |
| 2002/0031125 A1 * | 3/2002 | Sato ............................ 370/394 |
| 2002/0125501 A1 * | 9/2002 | Dicks ......................... 257/200 |
| 2005/0075154 A1 * | 4/2005 | Bordes et al. ................ 463/1 |

OTHER PUBLICATIONS

U.S. Appl. No. 11/343,367, filed Jan. 31, 2006, Chan, C.B. et al., Xilinx, Inc. 2100 Logic Drive, San Jose, CA 95124.
U.S. Appl. No. 11/314,486, filed Dec. 21, 2005, Ballagh, Jonathan B., et al., Xilinx, Inc. 2100 Logic Drive, San Jose, CA 95124.
Data2Mem Memory Tool, accessible from http://www.xilinx.com/products/ipcenter/dr_dt_data2men.htm, Xilinx, Inc. 2100 Logic Drive, San Jose, CA 95124, 1 page, 2008.

* cited by examiner

*Primary Examiner*—Hong Cho
*Assistant Examiner*—Robert C Scheibel
(74) *Attorney, Agent, or Firm*—Keven T. Cuenot (57) ABSTRACT

A network processor, disposed on an integrated circuit can include an ingress unit having a dual port block random access memory and an egress unit having a dual port block random access memory. The network processor further can include a network interface configured to write packetized data to the ingress unit and read packetized data from the egress unit as well as a coordination processor configured to coordinate movement of data between the network interface, the ingress unit, and the egress unit.

7 Claims, 3 Drawing Sheets

| Preamble | Start Frame Delimiter | Ethernet Header | | | Ethernet Payload | | FCS |
|---|---|---|---|---|---|---|---|
| | | Destination MAC Address | Source MAC Address | EtherType | Ethernet Header Padding | Metadata Co-simulation Data | |
| 7 Bytes | 1 Byte | 6 Bytes | 6 Bytes | 2 Bytes | 2 Bytes | 4n Bytes | 4 Bytes |

PARAMETERIZABLE COMPACT NETWORK PROCESSOR FOR LOW-LEVEL COMMUNICATION WITH AN INTEGRATED CIRCUIT

BACKGROUND

1. Field of the Invention

The present invention relates to the field of integrated circuits and, more particularly, to a network processor implemented using an integrated circuit (IC) having programmable logic and programmable interconnects.

2. Description of the Related Art

Electronic circuit designs can be constructed, simulated, debugged, and translated into electronic hardware using a High Level Modeling System (HLMS). Typically, an HLMS is implemented as a software-based design tool which provides blocks that can be combined to build a circuit design. A block refers to a high level software construct which represents a particular circuit function, such as multiplexing, addition, multiplication, or the like. The blocks can be arranged within the HLMS to form a circuit and/or system. Communication among the blocks can be represented by wires, or signals, which graphically link the blocks. Once configured, the HLMS can run various simulations upon the design. The HLMS further can generate a hardware implementation from the block representation of the circuit design. For example, an HLMS can generate the bitstream necessary to program a field programmable gate array (FPGA) or can generate hardware description language (HDL) files necessary to specify the hardware design.

One example of an HLMS is System Generator™, available from Xilinx, Inc. of San Jose, Calif. System Generator™ is a system level modeling tool that facilitates FPGA hardware design. System Generator™ can function with other design tools to provide a modeling environment that is well suited to hardware design. The System Generator™ tool provides high level abstractions, i.e., blocks, which can be automatically compiled into an FPGA. In addition, access to underlying FPGA resources can be provided through low level block abstractions which facilitate the construction of highly efficient FPGA designs.

It is possible to incorporate circuit designs, which already have been implemented in hardware, back into the HLMS development environment. To do so, a high bandwidth communication channel must be established between the computer system hosting the HLMS and the device under test (DUT). The DUT typically is a design implemented within a programmable logic device (PLD) such as an FPGA. The PLD is installed on a hardware platform which is coupled to the host computer system via the high bandwidth communication link. The process of running a simulation involving a hardware platform and a software platform working cooperatively with one another is referred to as hardware co-simulation. One variety of hardware co-simulation interface that provides a high-bandwidth link between the host computer system and the hardware platform is a point-to-point Ethernet connection. With point-to-point Ethernet hardware co-simulation, low-level Ethernet frames are transmitted between the host computer system and the hardware platform.

Network processors often are used with network specific applications to increase the efficiency of the network. A network processor typically is implemented as a software-controlled integrated circuit which has been optimized for use in applications involving network routing and packet processing. While there is no standard architecture, many network processors feature complex architectures having multiple CPU's running in parallel. In such a configuration, one CPU usually receives and handles network control packets while the other CPU's pass data packets through the system at network speeds. In any case, a network processor can perform functions such as packet classification, traffic shaping, queuing, and the like.

It would be beneficial to minimize the size and complexity of a network processor such that the network processor can be implemented on a PLD while conserving available PLD resources.

SUMMARY OF THE INVENTION

The present invention provides a solution for a network processor. One embodiment of the present invention can include a network processor disposed on an integrated circuit (IC). The network processor can include an ingress unit having a dual port block random access memory, an egress unit having a dual port block random access memory, a network interface configured to write packetized data to the ingress unit and read packetized data from the egress unit, as well as a coordination processor configured to coordinate movement of data between the ingress unit, the egress unit, and a system implemented on the IC. In one aspect of the present invention the IC is a programmable logic device (PLD).

In one embodiment, each of the dual port block random access memories can include a network type data port coupled to the network interface. Each network type data ports further can have a bit width which conforms to the network interface. Each dual port block random access memory further can include a processor type data port having a bit width which conforms to the coordination processor. Data width conversion can be performed by receiving data into one type of data port and providing data through the other type of data port. The network type data port(s) can be driven by a first clock frequency and the processor type data port(s) can be driven by a second clock frequency.

The dual port block random access memory of the ingress unit can include a plurality of distinct address spaces, wherein data received into the dual port block random access memory of the ingress unit is written into different ones of the plurality of distinct address spaces in an alternating fashion.

The coordination processor can include an network processor controller configured to extract non-packetized data from packetized data stored in the dual port block random access memory of the ingress unit by reading the packetized data starting at an address immediately following header information of each item of packetized data. The coordination processor further can include a command processor configured to route non-packetized data between the network processor controller and an interface to the system implemented on the IC. The dual port block random access memory of the egress unit can include read only header information which is inserted into non-packetized data that is written to the egress unit to packetize the non-packetized data.

The network processor controller can write non-packetized data from the command processor to a location immediately following the header information within the dual port block random access memory of the egress unit. The network interface can read information from the dual port block random access memory of the egress unit starting at an address corresponding to a beginning of the header information and continuing through the non-packetized data from the command processor.

Further, one or more parameters of the network processor can be reconfigured according to a value of a generic of a hardware description language representation of the network processor.

Another embodiment of the present invention can include a method of processing packets within a network processor. The method can include writing packetized data to an input buffer of the network processor via a network data port of the input buffer. Non-packetized data can be extracted from the packetized data of the input buffer by reading from an address of the input buffer corresponding to a location immediately following header information of the packetized data. The non-packetized data can be read out of the input buffer via a processor data port of the input buffer.

Non-packetized data from a system on a same PLD as the network processor can be written to an output buffer via a processor data port of the output buffer. The non-packetized data from the system can be written starting at a location immediately following pre-stored header information within the output buffer. The non-packetized data of the output buffer can be packetized by reading from a beginning of the pre-stored header information in the output buffer and continuing through a location corresponding to an end of the non-packetized data of the output buffer, wherein the packetized data is read from the output buffer via a network data port.

The network data ports can be configured with a different memory aspect ratio than the processor data ports. In one embodiment, for example, the network data port of the input buffer can have a bit width corresponding to a network interface and the processor data port of the input buffer can have a bit width which is different from that of the network data port of the input buffer. Further, the network data port of the output buffer can have a bit width corresponding to a network interface and the processor data port of the output buffer can have a bit width which is different from that of the network data port of the output buffer. Further, the network data ports can be driven at a frequency which conforms to the network interface. Each processor data port can be driven at a different frequency than is used to drive the network data ports.

Another embodiment of the present invention can include a machine readable storage, having stored thereon, a computer program having a plurality of code sections executable by a machine for causing the machine to perform the various steps disclosed herein.

BRIEF DESCRIPTION OF THE DRAWINGS

There are shown in the drawings, embodiments which are presently preferred, it being understood; however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The present invention provides a solution for a network processor configuration. In accordance with the inventive arrangements disclosed herein, a network processor architecture is disclosed which is suitable for processing "raw", or low-level, Ethernet frames. The network processor can be implemented using an integrated circuit (IC) having programmable logic and programmable interconnects, for example, a programmable logic device (PLD). The embodiments disclosed herein provide an efficient network processor which leaves sufficient resources available on the PLD to be used to implement other systems and/or devices.

In one embodiment, the network processor can be implemented using dual port block RAM (BRAM). Use of dual port BRAM reduces operations such as packet buffering, classification/qualification, and header removal into read/write operations implemented on the BRAM. The operations can be carried out concurrently and "on-the-fly" when packet data is streamed into an ingress buffer of the network processor. In addition, header removal and injection can be achieved with little or no latency by adjusting the BRAM address. Further, certain optimizations can be made to the network processor if the network application can function in the absence of error checking and timeout protocols employed by higher level protocols such as TCP/IP. This type of communication is suitable for certain network applications, such as point-to-point simulation, where the error rate of the communication link is negligible.

Figure 1:
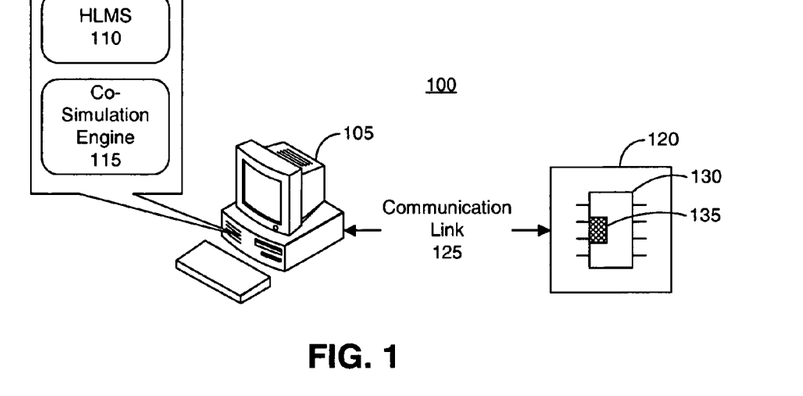
FIG. 1 is a schematic diagram illustrating a system for performing co-simulation in accordance with one embodiment of the present invention.

FIG. 1 is a schematic diagram illustrating a system 100 for performing co-simulation in accordance with one embodiment of the present invention. System 100 is presented as one example of an application in which a network processor configured in accordance with the inventive arrangements disclosed herein can be used. It should be appreciated, however, that the network processor can be used in any of a variety of different applications. Accordingly, although co-simulation is referenced in various instances and examples throughout this description, such illustrations and examples are not intended to limit the scope of the present invention in any way.

As shown, system 100 can include a host computer system 105 which can execute an HLMS 110 and a co-simulation engine 115. The host computer system 105 is communicatively linked with a hardware platform 120 via a communication link 125. The hardware platform 120 includes an IC such as PLD 130, which further includes a network processor 135 disposed therein. An example PLD is a field programmable gate array (FPGA) from Xilinx, Inc. of San Jose, Calif. As noted, co-simulation refers to the situation in which a hardware design, in this case implemented in PLD 130, is incorporated within a simulation environment such as HLMS 110. This allows an actual hardware design implementation to be tested in conjunction with various software-based models of physical systems and/or components.

Communications between the host computer system 105 and the hardware platform 120 can be formatted and conducted according to a specified communication protocol. In one embodiment of the present invention, communications can be formatted and conducted using a point-to-point Ethernet communication link as specified in IEEE standard 802.3. Still, it should be appreciated that the present invention can be used with any of a variety of different communication system configurations and/or protocols depending upon the particular application to which the inventive arrangements are to be applied.

The HLMS 110 typically includes a hardware co-simulation block, which is a software proxy for the PLD 130. The hardware co-simulation block can function much the same way as other software blocks of the HLMS 110 in that signals from other blocks (i.e. software-based models of physical components and/or systems) within the HLMS 110 can be consumed by the hardware co-simulation block and signals generated by hardware co-simulation block can be provided to, and interpreted by, other blocks within the HLMS 110.

The hardware co-simulation block communicates with a co-simulation engine 115 that typically is distinct from the HLMS 110, but can execute within the host computer system 105. In general, the hardware co-simulation block executes generic function calls to the co-simulation engine 115. These generic function calls can include, but are not limited to, opening and closing the hardware platform 120, managing data I/O with the hardware platform 120, and controlling clock sources for the PLD 130. The co-simulation engine 115 translates the generic function calls from the hardware co-simulation block into instructions specific to the hardware platform 120, and thus, the PLD 130. The instructions are sent from the co-simulation engine 115 to the hardware platform 120 via communication channel 125.

The network processor 135 can perform tasks including, but not limited to, packet filtering, header removal, header injection, clock domain crossing, as well as data-width conversion. It should be appreciated that the particular network-related tasks to be performed by the network processor 135 can vary depending upon the application and/or the communication protocol used. Accordingly, the list of networking operations disclosed herein is not intended to be a limitation of the present invention, but rather serve as examples of possible functions which can be performed.

Figure 2:
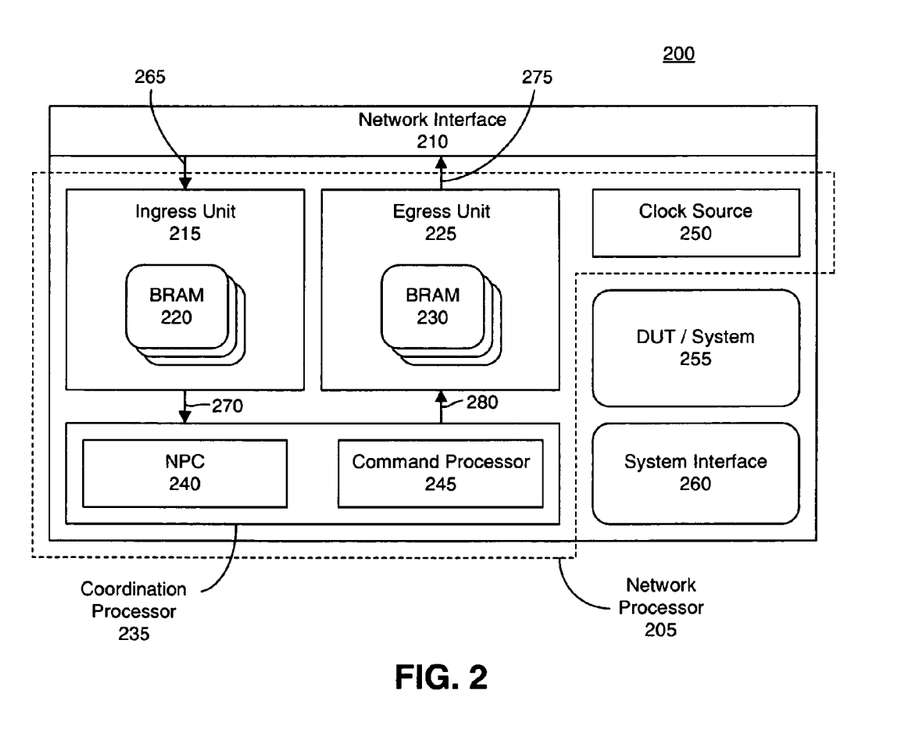
FIG. 2 is a schematic diagram illustrating a network processor configuration in accordance with the inventive arrangements disclosed herein.

FIG. 2 is a schematic diagram illustrating an architecture for a network processor in accordance with the inventive arrangements disclosed herein. In general, PLD 200 can be divided into two portions. The first portion is occupied by a network processor 205 implementation. The second portion is occupied by remaining resources that are available for other uses and/or applications such as the DUT (or other system) 255, the system interface 260, and/or the network interface 210. In one embodiment of the present invention, the PLD 200 can be an FPGA.

In one embodiment of the present invention, the network interface 210 can be an Ethernet Media Access Control (EMAC) in accordance with the IEEE 802.3 specification. It should be appreciated, however, that the present invention is not to be limited solely to this type of communication protocol. Rather, any suitable network interface can be used depending upon the particular application and/or communication protocol used to interface the PLD 200 with another system.

The network processor 205 further can include an ingress unit 215, an egress unit 225, as well as a coordination processor 235. The network processor 205 further can include clock source 250. The ingress unit 215 can perform functions such as buffering, queuing, filtering, metadata processing, and header removal. As shown, the ingress unit 215 can include one or more BRAM's 220 forming an input buffer. BRAM 220 can be a dual port BRAM where each data port 265 and 270 can operate at a different clock frequency. Further, each data port of the dual port BRAM 220 can be configured with a different memory aspect ratio. The egress unit 225 can perform functions such as buffering and header injection. Like the ingress unit 215, the egress unit 225 can include one or more BRAM's 230 forming an output buffer. BRAM 230 can be a dual port BRAM. Like BRAM 220, each data port 275 and 280 of BRAM 230 can be driven at a different clock frequency and have a different memory aspect ratio.

The coordination processor 235 can include a network processor controller (NPC) 240 and a command processor 245. Though described as processors, both the NPC 240 and the command processor 245 can be implemented with logic from the fabric of PLD 200 and need not be implemented using actual processor or CPU resources. In an alternative embodiment either the command processor 245 or NPC 205 or any combination thereof, can be implemented using one or more embedded processors such as the Power PC(s) in the Virtex II Pro FPGA from Xilinx, Inc. The NPC 240 can process packets stored within BRAM 220, which were received from the network interface 210, and remove header information from the packets. Processed packets can be forwarded from the NPC 240 to the command processor 245, which functions as an interface to the portions of the PLD 200 located outside of the network processor 205. With respect to outgoing packets, the NPC 240 can obtain data from the command processor 245 and write such data to BRAM 230. BRAM 230 can be pre-initialized to include a vector specifying header information which can be used by the NPC 240 to inject header information into data written into BRAM 230, thereby packetizing the data.

Clock source 250 can drive various portions of the PLD 200. In one embodiment, the clock source 250 can include a plurality of different clock sources capable of driving components at different frequencies. Accordingly, data port 265 of BRAM 220 and data port 275 of BRAM 230 can be driven by clock source 250 at the same frequency at which the network interface 210 is driven. This frequency can conform to the network communication protocol used to communicate with the host computer. In the case where Gigabit Ethernet is used, the frequency can be, for example, 125 MHz. The data ports of BRAM's which are communicatively linked with the coordination processor 235, i.e. data ports 270 and 280, can be driven at a different clock rate, such as the frequency at which the coordination processor 235 operates. This can be the same frequency as the rest of the PLD 200. Operating the different data ports of BRAM's 220 and 230 at different frequencies allows each buffer to perform clock domain crossing as data can be read into each BRAM using one data port clocked at a first frequency and read out via a different data port clocked at a second and different frequency.

The command processor 245 functions as an application specific interface to the remainder of the PLD 200. In this case, for example, the command processor 245 performs various co-simulation interface functions, being able to process co-simulation data. The command processor 245 communicates with the DUT 255 via a system interface 260, which can be a hardware co-simulation interface when performing co-simulation. It should be appreciated that were the functions of the remaining portions of the PLD 200, in this case the DUT 255, to be changed, the implementation of command processor 245 also would be changed to provide any command and/or data interpretation necessary for the selected application and to communicate with the other on-chip systems and/or devices.

As noted, use of dual port BRAM reduces operations such as packet buffering, classification/qualification, and header removal into read/write operations implemented within the BRAM. The operations can be carried out concurrently and "on-the-fly" when the packet data is streamed into an ingress buffer of the network processor. Header removal and injection can be achieved with little or no latency by adjusting the block RAM address.

Implementing the network processor 205 using a PLD 200 allows various aspects of the network processor 205 to be changed or altered through the use of various parameters. More particularly, selected functions and/or components of the network processor 205 can be changed by setting different values for hardware description language (HDL) generics during compilation. In illustration, it may be desirable to change the size of the ingress and/or egress buffer size at compile time to optimize resource usage for a given application. Some applications may not require a memory buffer that is as large as that which may required by other applications. Other modules and/or functions of the network processor 205 can be modified as may be required according to the particular application in which the network processor 205 is to be used. Such modifications can be accomplished by changing the values of other HDL generics. Such parameterization is possible as the network processor 205 is implemented using PLD technology.

Figure 3:
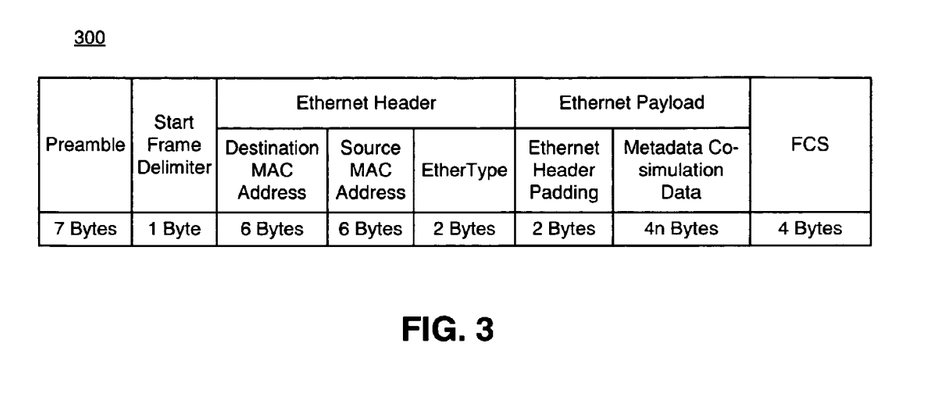
FIG. 3 is a schematic diagram illustrating a structure for a frame which can be exchanged over a communication link between a programmable logic device (PLD) and a network-connected system in accordance with another embodiment of the present invention.

FIG. 3 is a schematic diagram illustrating a structure for a frame 300 which can be exchanged over a communication link between a PLD and a network-connected system in accordance with another embodiment of the present invention. More particularly, frame 300 can be used in the context of co-simulation between a host computer system and a PLD having a network processor disposed therein. While any of a variety of different communication protocols can be used, frame 300 illustrates a structure for an Ethernet frame. The Ethernet Header can include a 6 byte destination MAC address, a 6 byte source MAC address, and a 2 byte Ethernet type (EtherType), where the Ethernet type can include a predetermined value indicating that the Ethernet payload is co-simulation related.

In general, the terms "frame" and "packet" are used interchangeably throughout this document to refer to the unit of data exchanged between the host computer system and the PLD. In the embodiment where Ethernet is used as the means of communication between the host computer system and the PLD, the term "frame" can refer to a raw Ethernet frame formatted according to IEEE standard 802.3. Specifically, the Ethernet II frame format can be used where the $13^{th}$ and the $14^{th}$ bytes immediately following the preamble are used as a type field for protocol identification. Accordingly, the term "packet" can refer to a frame in the context of Ethernet co-simulation, which has the appropriate alignment in the frame layout and which encapsulates metadata and commands and/or responses as the frame payload.

Figure 4:
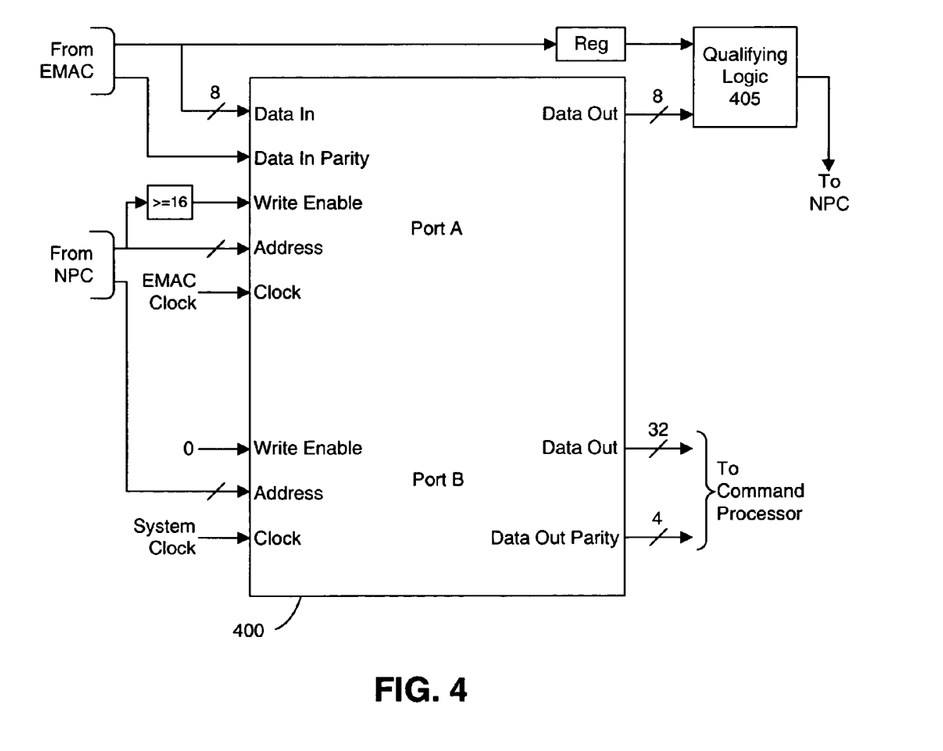
FIG. 4 is a schematic diagram illustrating a portion of an ingress unit of a network processor in accordance with the inventive arrangements disclosed herein.

FIG. 4 is a schematic diagram illustrating a portion of an ingress unit of a network processor in accordance with the inventive arrangements disclosed herein. FIG. 4 illustrates an embodiment of the present invention in which Ethernet is the means of communication between the host computer system and the PLD. In such an embodiment, the network interface, implemented as an EMAC, receives input from the host computer system in the form of a byte stream. The EMAC stores the incoming packets within a sequential address space within the ingress unit.

As discussed, the address space of the ingress unit is formed of one or more dual port BRAM's 400, such as may be found in the Virtex 2 and Virtex 4 FPGA from Xilinx, Inc. The number of BRAM's used can vary according to the maximum frame size supported by the co-simulation. In any case, data written to the address space is written via data port A. As shown, data port A of BRAM 400 is driven by the EMAC clock. Data port B, which outputs data to the command processor, is driven by a system clock which operates at the same frequency as the command processor.

BRAM 400 further can be used to perform data width conversions. The EMAC typically is configured to process 8 bit data, whereas the command processor typically is configured to process 32 bit data. BRAM 400 can be configured such that data port A, which is accessed by the EMAC, has a data width of 8 bits. Data port B, which is linked with the command processor, can be configured with a data width of 32 bits. Though not shown, BRAM's located within the egress unit can have a similar configuration where the data port that is coupled to the command processor has a 32 bit width and is clocked using the same clock source that drives the command processor. The data port that is coupled to the EMAC can have a width of 8 bits and can be driven by the same clock source that drives the EMAC.

The sequential address space of the ingress unit further can be pre-initialized with a 16 byte vector starting at address 0. The portion of the address space containing the 16 byte vector can be maintained as read-only memory. The vector can be used to store an Ethernet header template which can be used by the NPC to filter out unrelated packets. The first 16 bytes of each packet can be matched against the vector using the qualifying logic 405. Any packets which do not match can be discarded.

During the first 16 cycles when a new packet is received, the BRAM's of the ingress unit can be set to read-only. On the second cycle, the first byte of the Ethernet header template can be retrieved from data port A. The first byte can be compared with the registered Data In from the EMAC, which is the first byte of the incoming packet. The comparison process can continue for 16 cycles to determine whether the incoming packet is relevant to co-simulation. If (1) the destination MAC address is the PLD MAC address, if (2) the source MAC address is the host computer system MAC address, and if (3) the EtherType (see FIG. 3) is a predefined value indicating co-simulation, the packet is co-simulation related. After the header of the incoming packet is examined and is determined to be co-simulation related, the BRAM Write Enable is activated and the remaining packet data are written to BRAM 400.

Thus, for the NPC to filter incoming frames, the MAC addresses of the host computer system and PLD must be specified and stored as the Ethernet header template in the input and output buffers before co-simulation begins. As noted, a header template can be pre-installed in the output buffer and used for injecting header information to packetize co-simulation data being sent from the network processor to the host computer system.

Ethernet header templates can be installed through BRAM content initialization using a tool such as the Data2MEM Memory Tool (Data2MEM) available from Xilinx, Inc. of San Jose, Calif. Data2MEM allows binary code to be converted into BRAM contents. The code becomes part of the bitstream. This technique for initializing the BRAM eliminates the need to rerun synthesis, implementation, and bitstream generation phases of PLD development. Further, facilitating post-implementation modification of the Ethernet header template allows users to choose different network interface cards after a particular PLD design has been compiled. A tool such as Data2MEM allows the Ethernet header template to be dynamically modified to reflect the current host MAC address before co-simulation begins and supports bitstream reuse, thereby saving time.

While the NPC can perform one variety of packet classification, the network interface, in this case the EMAC, can perform another variety of packet classification. The EMAC can determine whether a received packet is qualified or unqualified by examining the FCS portion of the packet. If the FCS portion of the packet includes an error, the packet can be marked as a bad packet or frame. The EMAC further can mark a frame as bad in the case of an overflow of the address space.

Figure 5:
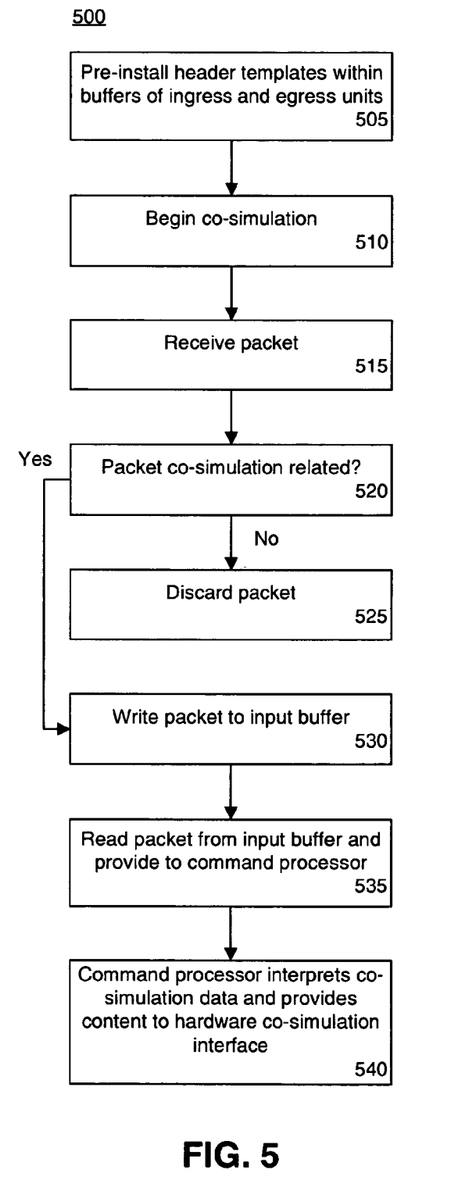
FIG. 5 is a flow chart illustrating a method of processing incoming data within a network processor in accordance with another embodiment of the present invention.

FIG. 5 is a flow chart illustrating a method 500 of processing incoming data within a network processor in accordance with another embodiment of the present invention. Method 500 can be performed by a network processor configured in accordance with the various embodiments described herein. Accordingly, method 500 can begin in step 505, where header templates are pre-installed in the buffers for both the ingress and egress units. As noted, the header templates can specify the MAC address of the host computer system as well as the PLD being incorporated into the co-simulation session.

In step 510, a co-simulation session can be started between the PLD and the host computer system. In one embodiment, the PLD can be an FPGA having a DUT implementation as well as a network processor implemented thereon. The host computer system can execute a software modeling system such as an HLMS or the like. As noted, co-simulation is described for purposes of illustration only. The network processor described herein can be used in any of a variety of different applications and is not limited solely to use within the context of co-simulation. In step 515, the network interface of the command processor within the PLD can receive a packet via the communication link with the host computer system. Incoming packets arrive at the network processor as byte-streams.

In step 520, a determination can be made as to whether the received packet is related to co-simulation. In particular, the network interface can compare the header information of the received packet with the pre-installed vector stored within the input buffer. If the two match, the packet is determined to be co-simulation related and the method can proceed to step 530. If the packet header information does not match the vector stored within the input buffer, the method can proceed to step 525, where the packet is discarded or ignored by the network processor as it is unrelated to co-simulation.

It should be appreciated that the network interface further can analyze the received packet to ensure that it conforms to the communication protocol used between the PLD and the host computer system. For example, in the case of Ethernet frames, the network interface can evaluate the packet for an FCS error or detect situations in which an overflow condition exists in the input buffer. In either case, the network interface can mark the frame as a "bad frame".

Continuing with step 530, the packet is written to the input buffer of the ingress unit. The packet can be written to the input buffer via the data port which is coupled to the network interface. This data port can be clocked at the same frequency as the network interface and further have a bit width which conforms to the network interface. In an embodiment where Ethernet is used, the data port can have a width of 8 bits.

In another embodiment of the present invention, the input buffer can be configured to include two identical address spaces. For example, the input buffer can be implemented using a BRAM-based ping-pong type of memory buffer. Once an entire qualified packet is written into the first address space, the reception process can be switched to the second address space. This allows the first address space to be controlled by the coordination processor, and particularly the NPC, while the second address space receives a new packet. Accordingly, the ingress unit can be switched to alternate between the first address space and the second address space thereby allowing uninterrupted data reception and processing.

In step 535, the packet can be read from the input buffer and supplied to the command processor. The packet can be read via a data port of the input buffer which is coupled to the command coordination processor, and particularly the command processor. Accordingly, this data port can be clocked at the same frequency as the command processor and further have a width which conforms to the command processor. As noted, in one embodiment, the width of this data port can be 32 bits. By receiving and sending data using different data ports being clocked at different frequencies, the ingress unit can span multiple clock domains and perform data width conversions.

The NPC can read the packet from the input buffer starting at an address which indicates a location in memory immediately following the end of the header information and the metadata of the received packet. The header information and the metadata are discarded. In this manner, the header information and metadata effectively are removed with little or no latency. The NPC then provides the resulting co-simulation data, i.e. the packet data with the header information and metadata removed, to the command processor.

In step 540, the command processor performs any interpretation and/or further processing of the co-simulation data which may be required and passes the resulting co-simulation data on to the hardware co-simulation interface. For example, the command processor can be configured to condition the co-simulation data for use by the DUT. In any case, the co-simulation data then can be used by the DUT for processing.

Figure 6:
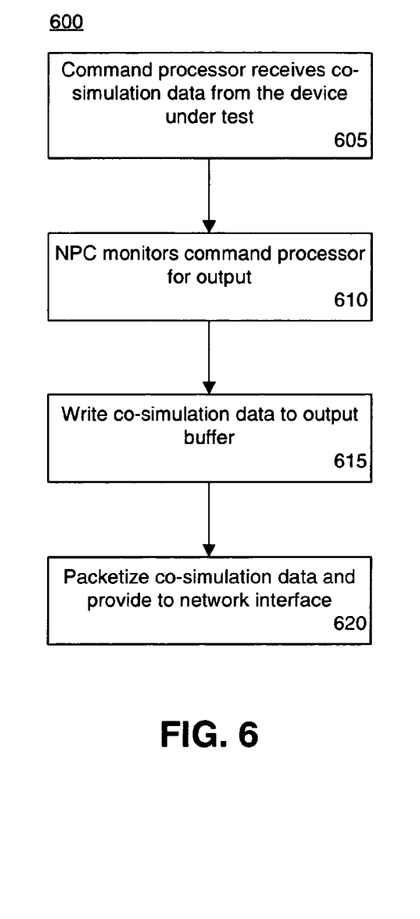
FIG. 6 is a flow chart illustrating a method of processing outgoing data within a network processor in accordance with another embodiment of the present invention.

FIG. 6 is a flow chart illustrating a method 600 of processing outgoing data within a network processor in accordance with another embodiment of the present invention. More particularly, method 600 describes a process of sending data from the DUT to the host processing system in accordance with one embodiment of the present invention. Still, as noted, co-simulation is described for purposes of illustration only is not intended to limit the scope of the present invention. In step 605, the command processor can receive co-simulation data from the DUT via the hardware co-simulation interface. The command processor can perform any processing that may be required in terms of conditioning the co-simulation data for use by the host processing system.

In step 610, the NPC continuously monitors the command processor for output. In step 615, the NPC receives the co-simulation data as output from the command processor and writes the co-simulation data to the output buffer of the egress unit. As noted, the output buffer can include a pre-loaded header template. In this case, the header information can be 16 bytes of data necessary for constructing an Ethernet packet header.

The NPC writes the co-simulation data to the output buffer consecutively and immediately following the pre-installed header template. In this manner, the NPC effectively wraps, or encapsulates, the co-simulation data with the Ethernet header information necessary to form a packet and transmit the packet to the host computer system. The NPC writes the co-simulation data to the output buffer via a data port which is coupled to the coordination processor. This data port can be clocked at the same rate as, and have the same bit width as the command processor.

Another advantage of implementing the network processor using a PLD is that the BRAM's can be reprogrammed at runtime. That is, using partial reconfiguration techniques supported by the target PLD, i.e. the PLD in which the network processor is implemented, the pre-installed protocol header template can be changed. As noted, a tool such as Data2MEM, for example, can be used to reprogram the BRAM's. This allows the network processor to be dynamically modified to support different communication protocols.

In step 620, the EMAC, or network interface, can take possession of the output buffer and read the packet. The network interface reads the packet from a data port of the output buffer which has a same bit width as the network interface and is further clocked at the same rate as the network interface. Accordingly, the egress unit facilitates the spanning of multiple clock domains. This allows the egress unit to perform data width conversion and span multiple clock domains.

The network interface then sends the packet to the host computer system. As noted, the network interface can read the content of the output buffer starting at the beginning of the Ethernet header template and continue through the end of the co-simulation data, thereby ensuring that the entire packet is read and sent to the host computer system.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "in4cluding" and/or "having", as used herein, are defined as comprising (i.e., open language). The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A network processor disposed on an integrated circuit (IC), said network processor comprising:
    an ingress unit comprising a dual port block random access memory;
    an egress unit comprising a dual port block random access memory;
    a network interface configured to write packetized data to said ingress unit and read packetized data from said egress unit; and
    a coordination processor configured to coordinate movement of data between said ingress unit, said egress unit, and a system disposed on the IC, said coordination processor further comprising a network processor controller configured to extract non-packetized data from packetized data stored in said dual port block random access memory of said ingress unit by reading the packetized data starting at an address immediately following header information of the packetized data, wherein the header information is discarded, and the coordination processor outputs the non-packetized data without the header information,
    wherein said dual port block random access memory of said egress unit comprises read only header information which is inserted into non-packetized data written to said egress unit to packetize the non-packetized data,
    wherein said ingress unit, said egress unit, said network interface, and said coordination processor are disposed within the IC.

2. The network processor of claim 1, wherein each of said dual port block random access memories comprises a network type data port coupled to said network interface and a processor type data port, wherein each said network type data port has a bit width which conforms to said network interface and each said processor type data port has a bit width which conforms to said coordination processor, such that data width conversion is performed by receiving data into one type data port and providing data through the other type data port.

3. The network processor of claim 2, wherein each said network type data port is driven by a first clock frequency and each said processor type data port is driven by a second clock frequency.

4. The network processor of claim 1, wherein said dual port block random access memory of said ingress unit is a ping-pong memory buffer comprising a plurality of distinct address spaces, wherein data received into said dual port block random access memory of said ingress unit is written into different ones of said plurality of distinct address spaces in an alternating fashion.

5. The network processor of claim 1, wherein said coordination processor further comprises a command processor configured to route data between said network processor controller and an interface to the system disposed on the IC.

6. The network processor of claim 5, wherein said network processor controller writes non-packetized data from said command processor to a location immediately following the header information within said dual port block random access memory of said egress unit, and wherein said network interface reads from said dual port random access memory of said egress unit starting at an address corresponding to a beginning of the header information and continuing through the non-packetized data from said command processor.

7. The network processor of claim 1, wherein at least one parameter of said network processor is reconfigurable according to a value of a generic of a hardware description language representation of said network processor.

* * * * *